Aug. 29, 1961 M. R. MARSHALL 2,998,191

ASYNCHRONOUS ADD-SUBTRACT SYSTEM

Filed May 11, 1959 3 Sheets-Sheet 2

Aug. 29, 1961 M. R. MARSHALL 2,998,191

ASYNCHRONOUS ADD-SUBTRACT SYSTEM

Filed May 11, 1959 3 Sheets-Sheet 3

United States Patent Office 2,998,191

Patented Aug. 29, 1961

2,998,191

ASYNCHRONOUS ADD-SUBTRACT SYSTEM

Melvin R. Marshall, Wappingers Falls, N.Y., assignor to International Business Machines Corporation, New York, N.Y., a corporation of New York Filed May 11, 1959, Ser. No. 812,504

12 Claims. (Cl. 235—153)

This invention relates to digital computer systems and particularly concerns circuit arrangements providing for addition or subtraction of binary numbers.

In a synchronous system, the time interval between initiation of successive steps of addition or subtraction may be sufficiently long to provide for successive propagation of carries through every carry of the highest order number the system is capable of handling. In other words, the time required for performance of a series of steps of addition or subtraction is equal to the number of steps performed times a fixed interval determined by the maximum number of carries that could ever possibly occur in any one step.

During performance of each step of addition or subtraction, the system of the present invention contemporaneously checks the correctness of the resulting sum or difference of the particuler numbers involved in that step, whereupon the next step may be promptly initiated without waiting for any additional period corresponding with orders not involved in the addition or subtraction of those particular numbers. Since the time consumed in any individual step is no greater than required for the actual number of carries involved in combining the particular numbers of that step, the total time required to perform and check a series of additions or subtractions is on the average much less than required by the conventional adder or subtractor to form the same series of operations to obtain an unchecked answer.

In accordance with the present invention, each stage of the system includes a first network for checking the correctness of the binary value stored in its sum or difference register and a second network for checking the correctness of the out-carry signal produced by the stage for transmission to the next higher stage. More specifically, the aforesaid first network includes two EXCLUSIVE-OR circuits whose outputs are supplied to an IF circuit which produces an output signal when the stored sum or difference is correct and the second network includes a Carry-Check circuit whose output and the out-carry signal are impressed upon a second IF circuit which produces an output signal when the out-carry signal is representative of the correct value of the out-carry.

Further in accordance with the invention, the outputs of the IF circuits of all stages are applied to an AND circuit which produces an output signal only when the addition or subtraction is completed and the total sum or difference, including all carries, is correct.

The invention further resides in logic circuits and systems having features of combination and arrangement hereinafter described and claimed.

For a more detailed understanding of the invention, reference is made in the following description to the accompanying drawings in which.

Figure 1:
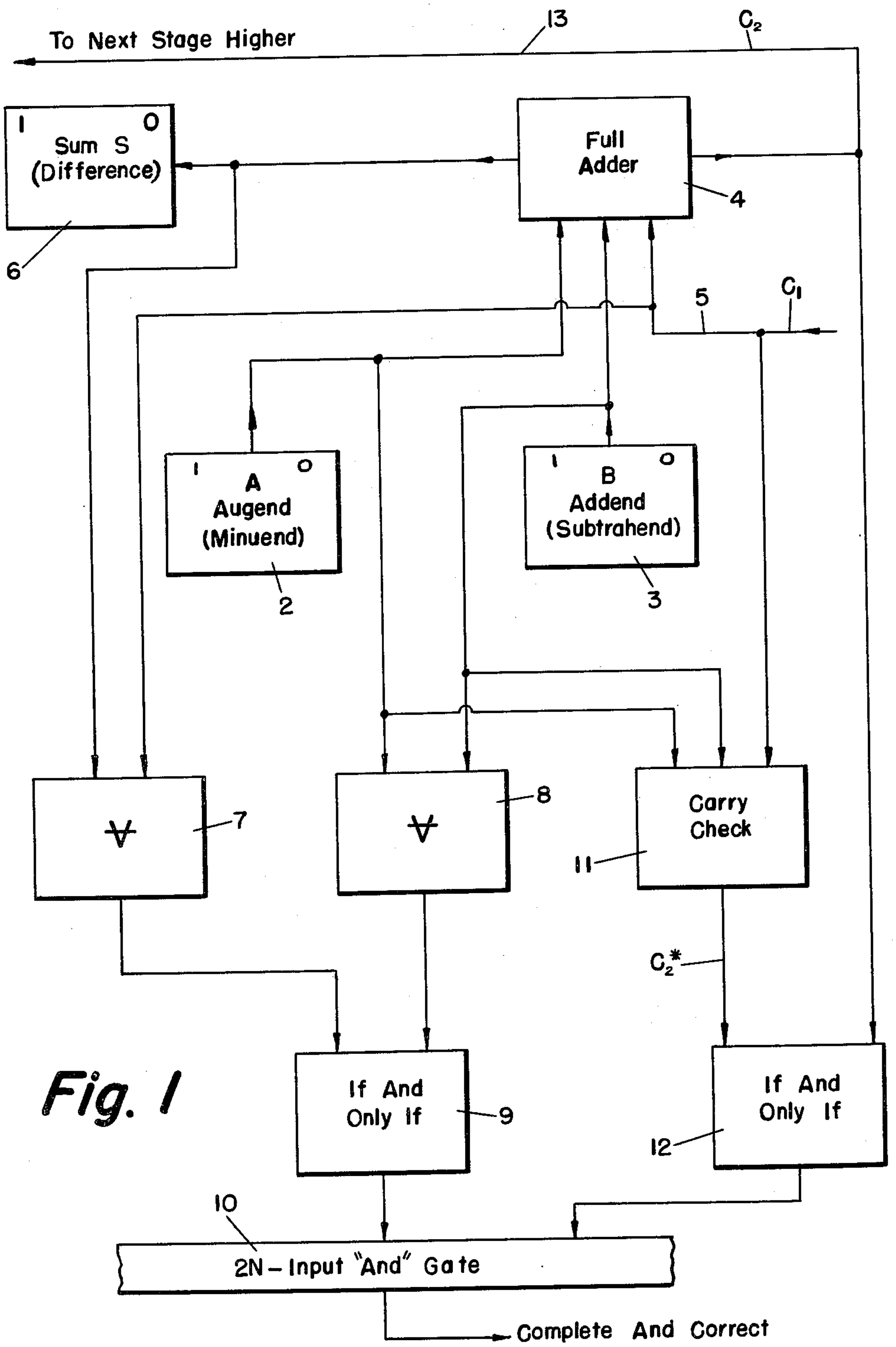
FIG. 1 is a block diagram illustrative of the basic network for a stage of an add-subtract system.

Referring to the block diagram of FIG. 1 as illustrative of a typical stage of a multi-order computer, the blocks 2 and 3 are representative of bistable registers of known type in which are respectively stored the binary values of quantities A and B. As indicated, the outputs of registers 2, 3 are impressed upon a full adder circuit 4 upon which is also impressed by line 5 a signal representing the binary value of any input carry $C_1$. The resulting sum S or difference D output of the adder 4 is impressed upon the sum-difference register 6 for storage and any resulting carry $C_2$ is applied to line 13 for transmission to the next higher stage of the computer.

Considering first the operation of addition as performed by the elements above identified, the upper five lines of Table I below show all of the possible combinations of the binary digital values of augend A, addend B, input carry $C_1$ and the resulting binary values of the corresponding sums S and out-carries $C_2$. In the first adder stage, only the first four columns of Table I apply since in such case the in-carry is always 0; in all subsequent adder stages, all eight columns of Table I are applicable. Lines 6 to 8 of Table I are later discussed in connection with checking of correctness of the sum and the out-carry.

TABLE I (FOR ADDITION)

| | | | | | | | | |
|---|---|---|---|---|---|---|---|---|
| Augend A | 0 | 1 | 0 | 1 | 1 | 0 | 1 | 0 |
| Addend B | 0 | 0 | 1 | 1 | 0 | 1 | 1 | 0 |
| In-Carry $C_1$ | 0 | 0 | 0 | 0 | 1 | 1 | 1 | 1 |
| Sum S | 0 | 1 | 1 | 0 | 0 | 0 | 1 | 1 |
| Out-Carry $C_2$ | 0 | 0 | 0 | 1 | 1 | 1 | 1 | 0 |
| $A \veebar B$ | 0 | 1 | 1 | 0 | 1 | 1 | 0 | 0 |
| $S \veebar C_1$ | 0 | 1 | 1 | 0 | 1 | 1 | 0 | 0 |
| $C_2$* | 0 | 0 | 0 | 1 | 1 | 1 | 1 | 0 |

Expressing line 4 of Table I in Boolean algebra notations, when the true sum S is 1

$$S=A\bar{B}\bar{C}_1+\bar{A}B\bar{C}_1+ABC_1+\bar{A}\bar{B}C_1 \quad (1)$$

and when the true sum S is 0.

$$S=\overline{ABC_1+\bar{A}\bar{B}C_1+\bar{A}B\bar{C}_1+A\bar{B}\bar{C}_1} \quad (2)$$

The correctness of the sum output of adder 4 is checked by a network comprising the two EXCLUSIVE-OR circuits 7, 8 and the IF circuit 9. For purpose of explanation, it will be assumed that the output of each of the EXCLUSIVE-OR circuits 7, 8 is negative (corresponding with 0) when its inputs are 0,0 or 1,1 and positive (corresponding with 1) when its inputs are 0,1 or 1,0.

As indicated in FIG. 1, the outputs of the augend and addend registers 2, 3 are respectively applied to the two inputs of the EXCLUSIVE-OR circuit 8 whose positive output may therefore be expressed as $$A\bar{B}+\bar{A}B \quad (3)$$

and whose negative output therefore may be expressed as $$AB+\bar{A}\bar{B} \quad (4)$$

Also as indicated in FIG. 1, the IN-carry $C_1$ and the sum output of the full adder 4 are respectively applied to the two input circuits of the EXCLUSIVE-OR circuit 7. As shown below, the positive or 1 output of the EXCLUSIVE-OR circuit may be expressed as $A\bar{B}+\bar{A}B$ (Equation 3). Specifically, the circumstances for which the EXCLUSIVE-OR circuit 7 produces a positive output may be derived as follows:

$$\text{Output of } \veebar\ 7=S\veebar C_1$$

$$\text{Output of } \veebar\ 7=S\overline{C}_1+S\overline{C}_1$$

since from Equation 1 $S=A\overline{B}\overline{C}_1+\overline{A}B\overline{C}_1+\overline{A}\overline{B}C_1+ABC_1$ then $$(A\overline{B}\overline{C}_1+\overline{A}B\overline{C}_1+\overline{A}\overline{B}C_1+ABC_1)\overline{C}_1$$

$$+\overline{(A\overline{B}\overline{C}_1+\overline{A}B\overline{C}_1+\overline{A}\overline{B}C_1+ABC_1)}C_1$$

$$=(A\overline{B}+\overline{A}B)\overline{C}_1+(A\overline{B}+\overline{A}B)C_1$$

$$=(A\overline{B}+\overline{A}B)(\overline{C}_1+C_1)$$

$$=A\overline{B}+\overline{A}B$$

In like manner it can be shown that the EXCLUSIVE-OR circuit 7 has a negative output for $AB+\overline{AB}$ (Equation 4). Thus, if the sum output of the adder 4 as stored in register 6 is correct, the outputs of the two EXCLUSIVE-OR circuits 7, 8 are alike. That this is so can be checked by inspection of lines 1 to 4 and 6, 7 of TABLE I. Such equality is checked in the computer stage of FIG. 1 by impressing the outputs of EXCLUSIVE-OR circuits 7, 8 upon the IF and ONLY-IF circuit 9 which produces an output signal only when both of its inputs are either negative or positive. When the outputs of the EXCLUSIVE-OR circuits 7, 8 are alike, the IF circuit 9 produces an output signal indicating that the sum S stored in register 6 of the stage is correct. The output of the IF circuit 9 may be applied to an AND-gate, exemplified by AND-gate 10 common to all stages. Assuming gate 10 has N sum inputs, one for each stage, it will produce an output indicating that the total sum is correct only when all of the IF circuits 9 of the N stages each produces an output signal indicating that the sum of the corresponding stage is correct.

The correctness of the carry output $C_2$ of adder 4 of FIG. 1 is checked by a network comprising the Carry-Check circuit 11 and the IF and Only-If circuit 12.

Expressing line 5 of Table I in Boolean algebra notation, when the true out-carry $C_2$ is equal to 1, (5) $$C_2=AB\overline{C}_1+A\overline{B}C_1+\overline{A}BC_1+ABC_1$$

and when the true out-carry $C_2$ is equal to 0, (6) $$C_2=\overline{(AB\overline{C}_1+A\overline{B}C_1+\overline{A}BC_1+ABC_1)}$$

As indicated in FIG. 1, the out-carry $C_2$ of adder 4 is not only transmitted to the next higher stage over line 13, but is also applied to one input of the IF circuit 12 in the same stage as adder 4. For purposes of explanation, it will be assumed that such output signal is positive for any of the four conditions defined in Equation 5 and is negative for any of the four conditions defined in Equation 6. To the other input of the IF circuit 12 is applied the output of the Carry-Check circuit 11.

As indicated in FIG. 1, the Carry-Check circuit 11 has three inputs respectively supplied by the augend and addend registers 2, 3 and the in-carry line 5. The output signal $C_2$* of circuit 11 is positive when at least two of its inputs are positive and is negative when at least two of its inputs are negative. The output signal $C_2$* of circuit 11 is applied to the other input of IF circuit 12.

When the signals $C_2$ and $C_2$* applied to the two inputs of IF circuit 12 are alike, that circuit produces an output signal indicating that the out-carry $C_2$ produced on line 13 for transmission to the next higher stage as its input carry is correct. Such output of IF circuit 12 may be applied to an AND-gate, exemplified by AND-gate 10 common to all stages. Assuming gate 10 has N such inputs, one for each stage, it will produce an output indicating that all carries have been completed and are correct when, and only when, all of the IF circuits 12 of the N stages each produces an output signal indicating that the out-carry of the corresponding stage is correct.

In the preferred arrangement of FIG. 1, the AND-gate 10 has 2N inputs, half of which are supplied from the IF circuits 9 of the N stages, and the remainder of which are supplied from the IF circuits 12 of the N stages. Thus, for addition, the single AND-gate 10 produces an output signal only when all of the stages have each correctly added the digits stored in their respective registers 2, 3 together with the in-carry, if any, and have also each produced the proper carry to the next higher stage.

Considering now the operation of subtraction: the binary digits of the minuend are respectively entered in the A (or B) registers of the corresponding stages and the binary digits of the complement of the subtrahend are respectively entered in the B (or A) registers. These values are combined together as above described for addition but, unlike for addition, there is also provided an In-Carry of 1 for the first stage to effect subtraction by the 1's complement method or the 2's complement method as later more fully described in connection with FIG. 2. By either method, the true difference of the minuend and subtrahend digit of each order will appear in the register 6 of the corresponding stage if the stage components have functioned properly.

In each stage, the correctness of the indicated or stored difference is checked by the network comprising the EXCLUSIVE-OR circuits 7, 8 and the IF circuit 9—the same network used for checking the correctness of the computed sum when the system is used for performing addition, as previously described.

It is again assumed, for purposes of explanation, that the output of each of the EXCLUSIVE-OR circuits is negative (corresponding with 0) when its inputs are 0,0 or 1,1 and positive (corresponding with 1) when its inputs are 0,1 or 1,0. As for addition, the outputs of the A and B registers 2, 3 are respectively aplied to the two inputs of the EXCLUSIVE-OR circuit 8, whose positive output may therefore be expressed as Equation 3 and whose negative output may be expressed as Equation 4.

Also as for addition, the two inputs of the EXCLUSIVE-OR circuit 7 are respectively supplied by the output of adder 4 and any in-carry on line 5. The EXCLUSIVE-OR circuit 8 produces a positive or 1 output for $A\overline{B}+\overline{A}B$ (Equation 3) and a negative or 0 output for $AB+\overline{AB}$ (Equation 4).

Thus, if the difference output of the adder 4 is correct, the outputs of the two EXCLUSIVE-OR circuits 7, 8 are alike. Such equality is checked in the stage of FIG. 1 by impressing the outputs of the EXCLUSIVE-OR circuits 7, 8 upon the IF circuit 9 which produces an output signal only when its inputs are either both positive or both negative.

The production of such signal by IF circuit 9 indicates that the difference D stored in register 6 of this stage is correct. The outputs of the IF circuits 9 of all stages may be applied to an AND-gate which therefore produces an output only when all of the stages have each produced the correct difference for storage in their respective difference registers.

The correctness of the out-carry of adder 4 is checked by the network comprising check circuit 11 and the IF circuit 12, the same network used for checking the correctness of the out-carry $C_2$ when the system is used for performing addition, as previously described.

As indicated in FIG. 1, the out-carry $C_2$ of adder 4 is not only transmitted to the next higher stage but is also applied to one input of IF circuit 12 of the same stage. To the other input of IF circuit 12 is applied the output $C_2$* of check circuit 11.

As indicated in FIG. 1, the three inputs to the check circuit 11 are respectively supplied from the minuend and subtrahend registers 2, 3, and the in-carry line 5. The output signal $C_2$* of the circuit 11 is positive when at least two of its inputs are positive and is of opposite polarity when at least two of its inputs are negative.

Thus, when the signals $C_2$ and $C_2$* applied to the inputs of IF circuit 12 are alike, that circuit produces an output signal indicating that the out-carry $C_2$ produced on line 13 for transmission to the next higher stage as its in-carry is correct. The outputs of the IF circuits 12 of all stages may be applied to an AND-gate 10 which produces an output signal indicating that all carries have been completed and are correct when and only when all of the IF circuits 12 each produces an output indicating that the out-carry of the corresponding stage is correct.

In the preferred arrangement of FIG. 1, the AND-gate 10 has 2N inputs, half of which are supplied from the IF circuits 9 of the N stages and the remainder of which are supplied from the IF circuits 12 of the N stages. Thus, for subtraction, a single AND-gate 10 may be provided to produce an output signal only when all of the stages have each correctly performed the step of subtraction involving the values stored in their registers 2, 3 and the value of the in-carry and have also each produced the proper out-carry for the next higher stage.

Figure 2:
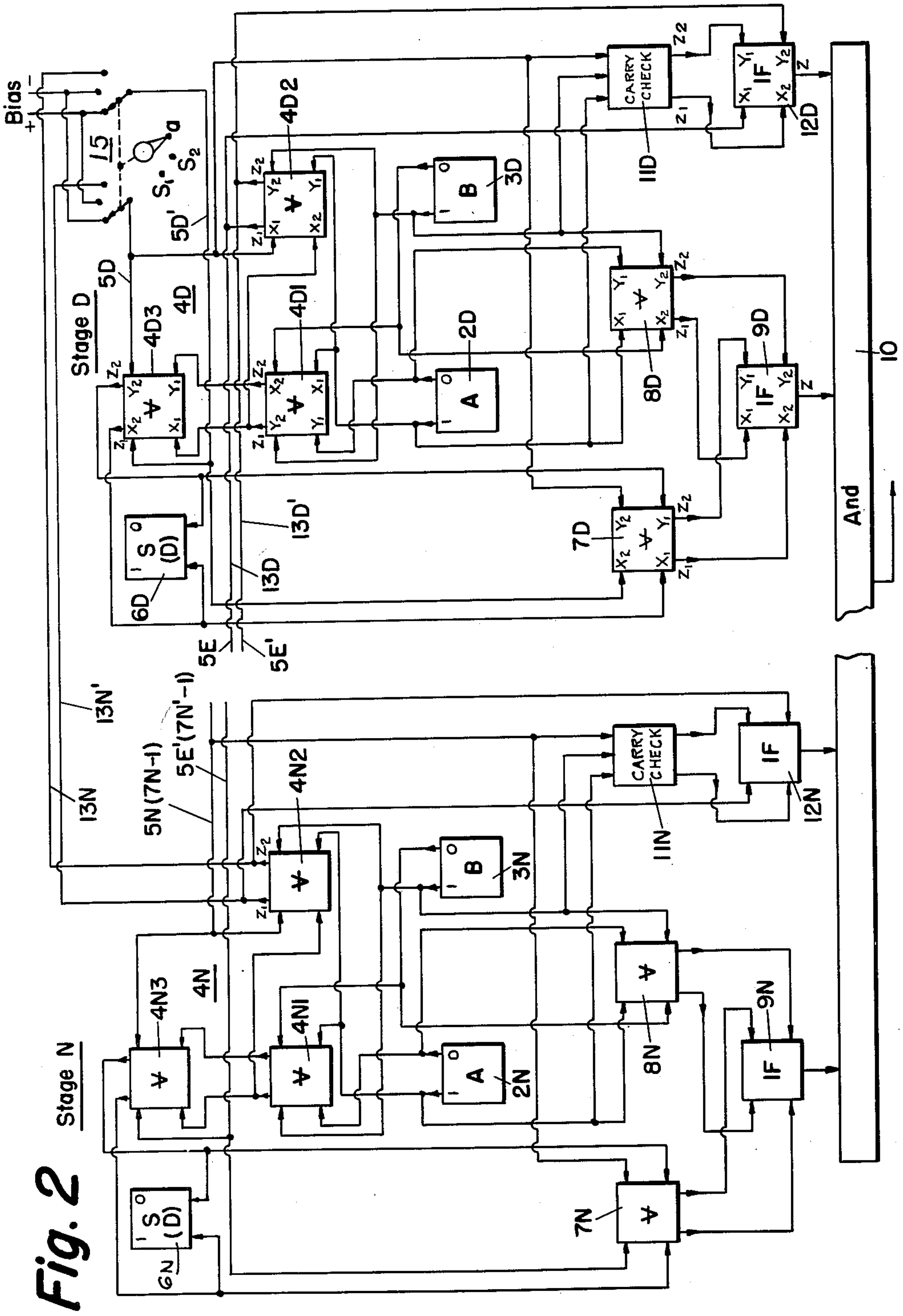
FIG. 2 is a block diagram showing in more detail the circuitry of the first and last stages of a multi-order adder-subtractor.

In FIG. 2 there is schematically shown the first and last stages of a multi-order system embodying the invention. All of the stages are similar to each other in composition, and consequently it suffices to describe only one of them in detail. The corresponding elements of the different stages are identified by the same reference characters plus a suffix corresponding with the particular stage. The first stage, stage D, selected for specific description is basically similar to FIG. 1 as to elements and interconnections, so that the preceding discussion of FIG. 1 is generally applicable thereto.

The adder 4D comprises three EXCLUSIVE-OR circuits 4D1, 4D2, 4D3, each of which has two pairs of input terminals ($X_1$, $X_2$; $Y_1$, $Y_2$) and one pair of output terminals ($Z_1$, $Z_2$). These three EXCLUSIVE-OR circuits, as well as the EXCLUSIVE-OR circuits 7D, 8D, are preferably each of the type shown in FIG. 3 and later discussed in detail. As shown in Table II below, when both signals applied to either pair of inputs are positive and the signals applied to the other pair of inputs are both negative, the $Z_1$ output signal is positive and the $Z_2$ output signal is negative. When the signals applied to one pair of inputs are of opposite polarity and the signals applied to the other pair of inputs are also of opposite polarity, the $Z_1$ output signal is negative and the $Z_2$ output signal is positive.

TABLE II (EXCLUSIVE-OR)

| Inputs | | | | Outputs | |
|---|---|---|---|---|---|
| $X_1$ | $X_2$ | $Y_1$ | $Y_2$ | $Z_1$ | $Z_2$ |
| + | − | − | + | − | + |
| − | + | + | − | − | + |
| + | + | − | − | + | − |
| − | − | + | + | + | − |
| + | − | + | − | − | + |
| − | + | − | + | − | + |
| + | + | + | + | + | − |
| − | − | − | − | − | + |

For purposes of explanation, it is assumed that when a 1 is stored in register 2D or 3D, the 1 output signal of that register is positive and the 0 output signal of that register is negative: conversely, when a 0 is stored in registers 2D or 3D, the 1 output signal of that register is negative and the 0 output signal is positive. In other words, each of the registers produces two output signals, a positive signal representing the value stored in the register and a negative signal representing the complement of that value.

As will appear from the following discussion, both of these signals are utilized. The 1 output of register 2D and the 0 output of register 3D are applied to one pair of input terminals ($X_1$, $X_2$) of the EXCLUSIVE-OR circuit 4D1. To the other pair of input terminals ($Y_1$, $Y_2$) of that EXCLUSIVE-OR circuit are applied the 0 output of register 2D and the 1 output of register 3D. Thus, as may be checked from Table II, when the value of the digit stored in either, but not both, of registers 2D and 3D is 1, the $Z_1$, $Z_2$ outputs of the EXCLUSIVE-OR circuit 4D1 are respectively positive and negative; on the other hand, when the values of the digits stored in registers 2D, 3D are both 0 or both 1, the $Z_1$, $Z_2$ outputs of the EXCLUSIVE-OR circuit 4D1 are respectively negative and positive. In other words, the $Z_1$ output of EXCLUSIVE-OR circuit 4D1 is positive, corresponding with 1, for $\bar{A}B+A\bar{B}$ and is negative for $\bar{A}\bar{B}+AB$: the $Z_2$ output of EXCLUSIVE-OR circuit 4D1 is positive, corresponding with 0, for $\bar{A}\bar{B}+AB$ and is negative for $\bar{A}B+A\bar{B}$.

The 1 outputs of registers 2D, 3D are applied to one pair of terminals ($Y_1$, $Y_2$) of the EXCLUSIVE-OR circuit 4D2. To the other pair of input terminals ($X_1$, $X_2$) of this EXCLUSIVE-OR circuit are applied the In-Carry signal $C_1$ on line 5D and the $Z_1$ output signal of EXCLUSIVE-OR circuit 4D1. Thus, as may be checked from Table II and FIG. 2, the out-carry signals $C_2$ supplied to line 13D from the $Z_1$ output of EXCLUSIVE-OR circuit 4D2 is positive (corresponding to 1) when the digital value of at least two of the quantities A, B, $C_1$ is 1, and is negative (corresponding to 0) when the digital value of at least two of the quantities A, B, $C_1$ is 0.

The $Z_1$ output of the EXCLUSIVE-OR circuit 4D1 and the complement In-Carry signal $C_1$ on line 5D′ are applied to one pair of input terminals ($X_1$, $X_2$) of the third EXCLUSIVE-OR circuit 4D3 of the adder 4D. To the other pair of input terminals ($Y_1$, $Y_2$) of this EXCLUSIVE-OR circuit are applied the $Z_2$ output of EXCLUSIVE-OR circuit 4D1 and the In-Carry signal on line 5D. Thus, as may be checked from Table II and FIG. 2, the $Z_1$ output of EXCLUSIVE-OR circuit 4D3 is positive (corresponding with 1) for storage of a 1 in sum register 6D when the digital value of only one or all of the quantities A, B, $C_1$ is 1 and the $Z_2$ output of that EXCLUSIVE-OR circuit is positive (corresponding with 0) for storage of a 0 in register 6D when the digital value of only one or all of the quantities A, B, $C_1$ is equal to 0.

To give a specific example of the operation of the elements of stage D as thus far described, it is assumed that it is desired to add the binary values 1,1 stored in the A and B registers 2D, 3D. For addition, the double-pole switch 15 is thrown to the "*a*" position indicated in FIG. 2 for which a negative potential corresponding with an in-carry $C_1$ of 0 is applied to line 5D and a positive potential corresponding with the complement value 0 of $C_1$ is applied to line 5D′. The register 2D has a positive output which represents $A=1$ and a corresponding negative output indicative of $\bar{A}$. These outputs are applied, as above described, to the inputs of the EXCLUSIVE-OR circuits 4D1, 4D2.

With regard to the EXCLUSIVE-OR circuit 4D1, the condition of $\bar{A}B+A\bar{B}$ is not satisfied since both A and B are each equal to 1; consequently, the $Z_1$ output of EXCLUSIVE-OR circuit 4D1 is negative and the $Z_2$ output thereof is positive.

With regard to EXCLUSIVE-OR circuit 4D2, its $X_1$, $X_2$ inputs from In-Carry line 5D and the $Z_1$ outputs of EXCLUSIVE-OR circuit 4D1 are both negative and its $Y_1$, $Y_2$ inputs from the 2D, 3D registers are both positive.

In such case, as shown in Table II, the $Z_1$ output of EXCLUSIVE-OR circuit 4D2 as applied to the Out-Carry line 13D is positive (corresponding with $C_2=1$) and the $Z_2$ output thereof as applied to the $\overline{\text{Out-Carry}}$ line 13D′ is negative. With regard to the EXCLUSIVE-OR circuit 4D3, the $X_1$, $Y_1$ inputs are respectively negative and positive since they are the aforesaid $Z_1$, $Z_2$ outputs of EXCLUSIVE-OR circuit 4D1: the $X_2$, $Y_2$ inputs of EXCLUSIVE-OR circuit 4D3 are respectively positive and negative, being the aforesaid bias potentials selected by switch 15. The EXCLUSIVE-OR condition is not satisfied, and as appears from line 2 of Table II, the $Z_1$, $Z_2$ outputs of EXCLUSIVE-OR circuit 4D3 are respectively negative and positive, thus effecting storage of a 0 in sum register 6D. The correctness of the sum value stored in register 6D is checked by the network comprising the EXCLUSIVE-OR circuits 7D, 8D and the IF circuit 9D.

As indicated in FIG. 2, the 1 output of register 2D and the 0 output of register 3D are applied to one pair of input terminals ($X_1$, $X_2$) of EXCLUSIVE-OR circuit 8D. To the other pair of input terminals ($Y_1$, $Y_2$) of that EXCLUSIVE-OR circuit are applied the 0 output of register 2D and the 1 output of register 3D. These two outputs are $A \veebar B$ and $\overline{A \veebar B}$. The polarities of the $Z_1$, $Z_2$ outputs of this EXCLUSIVE-OR circuit for various combinations of inputs are shown in Table II.

Also as indicated in FIG. 2, the $X_2$, $X_1$ inputs of the EXCLUSIVE-OR circuit 7D are respectively supplied by the complement In-Carry line 5D' and the $Z_1$ output of the EXCLUSIVE-OR circuit 4D3: the $Y_2Y_1$ outputs of EXCLUSIVE-OR circuit 7D are respectively supplied by the In-Carry line 5D and the $Z_2$ output of the EXCLUSIVE-OR circuit 4D3. The $Z_1$, $Z_2$ outputs of EXCLUSIVE-OR circuit 4D3 are $\text{SUM} \veebar C_1$ and $\overline{\text{SUM} \veebar C_1}$.

The $X_1$, $X_2$ inputs of the IF circuit 9D are respectively supplied by the $Z_1$ outputs of EXCLUSIVE-OR circuits 8D and 7D and the $Y_1$, $Y_2$ inputs of that IF circuit are supplied by the $Z_2$ outputs of the EXCLUSIVE-OR circuits 7D, 8D.

Figure 4:
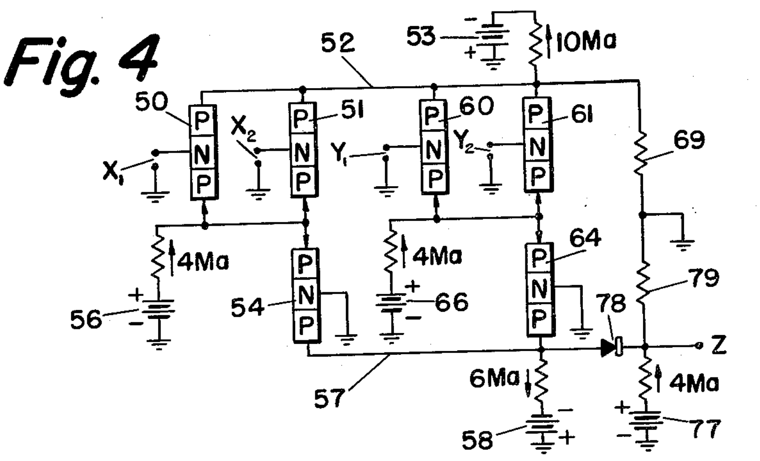

As will clearly appear from discussion of FIG. 4, the IF circuit 9D produces a positive output signal only when the inputs $X_1$, $X_2$ are both positive and the inputs $Y_1$, $Y_2$ are both negative, or vice versa, as shown in Table III.

TABLE III (IF)

| Inputs | | | | Output |
|---|---|---|---|---|
| $X_1$ | $X_2$ | $Y_1$ | $Y_2$ | Z |
| + | + | − | − | + |
| − | − | + | + | + |
| + | − | + | − | − |
| − | + | − | + | − |

Considering the specific example under discussion and applying the sum-check operation, the positive 1 and negative 0 outputs of the registers 2D, 3D as applied to the EXCLUSIVE-OR circuit 8D produce a negative $Z_1$ output and a positive $Z_2$ output jointly denoting $\overline{A \veebar B}$. The EXCLUSIVE-OR circuit 7D also produces a negative $Z_1$ output and a positive $Z_2$ output because under the stated condition of $A=1$, $B=1$ (i.e., Sum=0) and $C_1=0$, its $X_2$, $Y_1$ inputs are positive and its $X_1$, $Y_2$ inputs are negative (see line 2 of Table II). In such case, the $X_1$, $X_2$ inputs of the IF circuit 9D are both negative and the $Y_1$, $Y_2$ inputs are both positive (line 2 of Table III), resulting in production of a positive output signal Z indicating that the value 0 appearing in the sum register 6D is correct.

The correctness of the out-carry value represented by the relative polarity of the potentials on lines 13D, 13D' is checked by the network comprising the carry-check circuit 11D and IF circuit 12D.

Figure 5:
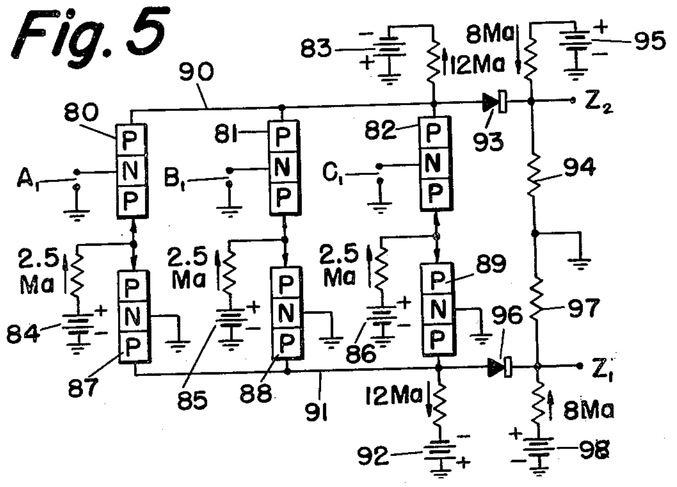

As indicated in FIG. 2, the 1 outputs of the registers 2D, 3D and the in-carry signal on line 5D are applied as inputs $A_1$, $B_1$, $C_1$ to the carry-check circuit 11D, a preferred form of which is shown in FIG. 5 and later described in detail.

All of the possible input combinations and the resulting $Z_1$, $Z_2$ outputs of this check circuit appear in Table IV below.

TABLE IV (CARRY-CHECK)

| Inputs | | | Outputs | |
|---|---|---|---|---|
| $A_1$ | $B_1$ | $C_1$ | $Z_1$ | $Z_2$ |
| − | − | − | − | + |
| + | − | − | − | + |
| − | + | − | − | + |
| + | + | − | + | − |
| + | − | + | + | − |
| − | + | + | + | − |
| + | + | + | + | − |
| − | − | + | − | + |

The $Z_1$ output of the carry-check circuit 11D and the signal on the out-carry line 13D are applied to one pair of inputs ($X_2$, $X_1$) of the IF circuit 12D: To the other pair of inputs ($Y_1$, $Y_2$) of that IF circuit are applied the $Z_2$ output of carry-check circuit 11D and the signal on the complement out-carry line 13D'. As may be checked from Table III, the IF circuit 12D produces a positive output signal only when the signals applied to one pair of inputs are both positive or both negative and the signals applied to the other pair of inputs are both negative or both positive.

Considering the specific example of addition under discussion and applying the carry-check operation, the positive 1 outputs of registers 2D, 3D and the negative potential on the in-carry line 5D as applied to the carry-check circuit 11D results in the production by the carry-check circuit of a positive $Z_1$ output and a negative $Z_2$ output. The positive $Z_1$ output of carry-check circuit 11D and the positive signal on the out-carry 13D are applied as the $X_2$, $X_1$ inputs of the IF circuit 12D. The negative $Z_2$ output of carry-check circuit 11D and the negative signal on the complement out-carry line 13D' are applied as the $Y_1$, $Y_2$ inputs of the IF circuit 12D. Thus, as shown in Table III, the IF circuit 12D produces a positive output signal, indicating that the out-carry $C_2$ of 1 represented by the positive signal on line 13D is correct.

Thus so far as stage D is concerned, the production of positive output signals by both of the IF circuits 9D and 12D indicates that the addition is complete and correct, i.e., that the sum value stored in register 6D is correct and that the out-carry $C_2$ of stage D is correct. It is to be understood that the out-carry lines of each stage become the in-carry lines of the next higher stage. For example, the line 13D becomes the in-carry line 5E of stage E and line 13D' becomes the complement in-carry line 5E' of stage E. In addition of multi-order binary numbers, the stages involved operate concurrently upon the values stored in their respective A and B registers, but since some stages may be required to operate upon in-carries and/or to produce out-carries, some stages may complete their operation in advance of others. However, in all cases when the two IF circuits of all stages involved have supplied output signals to AND-gate 10, the output signal produced by that gate indicates that the total sum stored in the registers 6D—6N is correct.

For subtraction by the 2's complement method, the switch 15 is shifted to its $S_2$ position for which the polarity of the in-carry lines (5D, 5D') of the first stage is reversed with respect to that used for addition, i.e., lines 5D and 5D' are now respectively positive and negative. Except for this switching operation, no change in circuitry is required. The digits of the minuend are stored in the A registers 2D—2N, the digits of the complement of the subtrahend are stored in the B registers 3D—3N, and the resultant appearing in the registers 6D—6N is the true difference.

By way of simple specific example, it is assumed that it is desired to subtract 11 from 25 and that the system has only six stages. In binary form, 25 is 011001 and the complement of 11 is 110100. As indicated below, the addition of these values together with Carry of 1 supplied for the first stage by the external bias gives the true difference 1110, i.e., 14 in decimal notation.

| Decimal | | Digital | |
|---|---|---|---|
| Minuend | 25 | 011001 | (25) |
| Subtrahend | 11 | 110100 | (11 complement) |
| | | 001101 | |
| | | 1 | In-Carry |
| True Difference | 14 | 1110 | |

For this method of subtraction, the Out-Carry of the highest order stage is not utilized.

When the IF circuit 9 of a particular stage produces an output signal, such signal is an indication the stage has properly combined the minuend and subtrahend digits of the corresponding order together with any carry from the preceding stage and that the resultant difference in register 6 of that stage is correct. When the IF circuit 12 of a particular stage produces an output signal, such signal is an indication that the stage has produced the proper out-carry. When the IF circuits 9 and 12 of all stages involved produce output signals, the AND-gate 10 produces an output signal indicating that the subtraction has been completed and is correct.

For subtraction by the 1's complement method, the switch 15 is shifted to its $S_1$ position for which the $Z_1$, $Z_2$ outputs of the EXCLUSIVE-OR circuit 4N2 of the highest order stage N of the computer are respectively applied to the in-carry lines 5D, 5D' of the lowest order stage D. Except for this switching operation which provides an end-around carry from the highest order stage to the lowest order stage, no change of circuitry is involved. The digits of the minuend are stored in A registers (2D—2N). The digits of the complement of the subtrahend are stored in the B registers (3D—3N) and the resultant appearing in registers 6D—6N is the true difference.

In the method of subtraction, the out-carry of the highest order stage is utilized as an end-around carry supplied to the lowest order stage as an in-carry. Again, when the IF circuit 9 of a particular stage produces an output signal, such signal is an indication that the stage has properly combined the minuend and subtrahend digits of the corresponding order together with any in-carry and that the resultant in register 6 of that stage is correct. When the IF circuit of a particular stage produces an output signal, such signal is an indication that the stage has produced the proper out-carry. When the IF circuits 9 and 12 of all stages involved produce output signals, the multi-input AND-gate 10 produces an output signal indicating that the subtraction has been completed and is correct.

Figure 3:
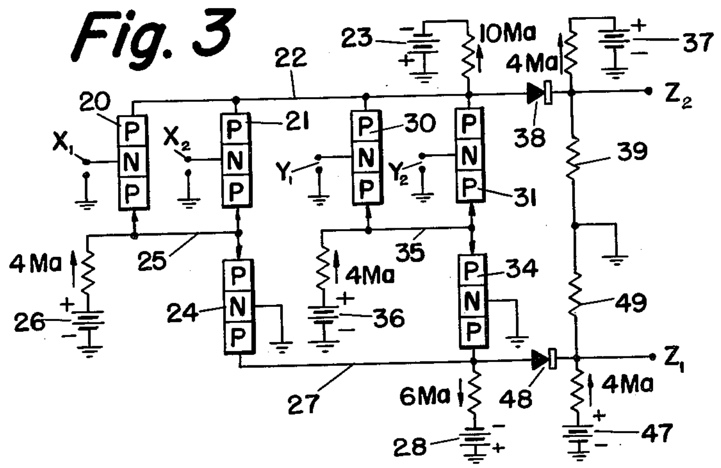
FIGS. 3, 4 and 5 are respectively circuit diagrams of EXCLUSIVE-OR circuits, IF circuits and Carry-Check circuits suited for the system shown in FIGS. 1 and 2.

As stated above, the EXCLUSIVE-OR circuit shown in FIG. 3 is exemplary of each of the EXCLUSIVE-OR circuits employed in the system of FIG. 2 and its inputs and outputs have the same designations as used in FIG. 2.

The $X_1$, $X_2$ signal inputs are applied to the base terminals of the transistors 20, 21 respectively. The collectors of this pair of transistors are connected by line 22 to the negative terminal of constant-current source 23. The emitters of this pair of transistors and of transistor 24 are connected by line 25 to the positive terminal of constant-current source 26. The base and collector terminals of transistor 24 are respectively connected to ground and to line 27 extending to the negative terminal of constant-current source 28.

The $Y_1$, $Y_2$ signal inputs are applied to the base terminals of transistors 30, 31 respectively. The collectors of this pair of transistors are connected to the negative supply line 22 of source 23. The emitters of this pair of transistors and of transistor 34 are connected by line 35 to the positive terminal of constant-current source 36. The base and collector terminals of transistor 34 are respectively connected to ground and to the negative supply line 27 of source 28.

The $Z_2$ output terminal of this EXCLUSIVE-OR circuit is connected to the positive terminal of constant-current source 37, to the line 22 through diode 38, and to ground through the output resistor 39. The $Z_1$ output terminal of this EXCLUSIVE-OR circuit is connected to the positive terminal of constant-current source 47, to the line 27 through diode 48, and to ground through output resistor 49. The diodes 38 and 48 are Zener diodes. The back-current through diode 38 maintains the collectors of transistors 20, 21, 30 and 31 at a negative potential with respect to ground. Diode 48 similarly biases the collectors of the transistors 24, 34.

It is assumed for purposes of explanation that the circuit parameters are such that the constant-current sources supply the current values indicated in FIG. 3 irrespective of the switched state of the associated transistors. Specifically, the sources 26, 36, 37 and 47 supply 4 milliamperes; the source 23 supplies 10 milliamperes; the source 28 supplies 6 milliamperes; and diodes 38, 48 provide a collector bias of −3 volts.

First considering the group of transistors 20, 21, 24, when the input signals $X_1$, $X_2$ are both positive, neither of the transistors 20, 21 is conductive, and, consequently, their collector current on line 22 is essentially zero. In such case, the transistor 24 is conductive and its collector current of 4 milliamperes flows on line 27. Additionally assuming that the $Y_1$, $Y_2$ inputs to transistors 30, 31 are both negative, the transistors 30, 31 are conductive and their combined collector current of 4 milliamperes appears on line 22. The transistor 34 of the group 30, 31, 34, however, is effectively switched off and its collector current on line 27 is essentially zero.

Thus, for these stated input conditions, the total current on line 22 is 4 milliamperes and the total current on line 27 is also 4 milliamperes. Having in mind that the current supplied by source 23 is 10 milliamperes, it thus appears that 6 milliamperes must be passed by diode 38 for addition to the 4 milliamperes on line 22. Of this 6 milliamperes, the source 37 supplies 4 milliamperes; the remaining 2 milliamperes flow to the diode 38 from source 23 through the path from ground including output resistor 39. Assuming this resistor to have a value of 300 ohms, the $Z_2$ output terminal is therefore 0.6 volt negative with respect to ground. Having in mind that the total current supplied by source 28 is 6 milliamperes, it thus appears that two milliamperes must be passed by diode 48 for addition to the 4 milliamperes on line 27. Since the total output current of source 47 is 4 milliamperes, whereas only 2 milliamperes flow therefrom through diode 48, the remaining two milliamperes flow through resistor 49 to ground. Thus, assuming resistor 49 to have a value of 300 ohms, the $Z_1$ output terminal is 0.6 volt positive with respect to ground.

In brief, when the inputs $X_1$, $X_2$ are both positive and inputs $Y_1$, $Y_2$ are both negative, the $Z_1$, $Z_2$ outputs of the EXCLUSIVE-OR circuit of FIG. 3 are respectively positive and negative.

From the foregoing, it is evident that the current on each of lines 22, 27 will also be 4 milliamperes when the inputs $X_1$, $X_2$ are both negative and the inputs $Y_1$, $Y_2$ are both positive. Consequently, for these input conditions also, the $Z_1$, $Z_2$ outputs of the EXCLUSIVE-OR circuit are respectively positive and negative.

There is now considered the case when one of the inputs $X_1$, $X_2$ is negative and the other positive, and one of the inputs $Y_1$, $Y_2$ is negative and the other positive. Under these circumstances, a current of 8 milliamperes is produced on line 22. However, the current on line 27 is concurrently essentially 0 since both of the transistors 24, 34 are effectively switched off. In this case 6 milliamperes flow through diode 48. Of this, 4 milliamperes flow from source 47, and the remaining 2 milliamperes flow from ground through output resistor 49, so making the output terminal $Z_1$ 0.6 volt negative with respect to ground. Since the collector current on line 22 is 8 milliamperes, the diode 38 must pass 2 milliamperes. Since the total current from source 37 is 4 milliamperes, of which only 2 milliamperes flow through diode 38, the remaining 2 milliamperes flow to ground through output resistor 39, so making the $Z_2$ terminal 0.6 volt positive with respect to ground.

Table V below will be of assistance in correlating the general input and output designations of the EXCLUSIVE-OR circuit of FIG. 3 with the specific inputs and outputs applied to it as used for the EXLUSIVE-OR circuits 4D1—4D3, 7D and 8D of FIG. 2.

TABLE V[1]

| V | $X_1$ | $X_2$ | $Y_1$ | $Y_2$ | $Z_1$ | $Z_2$ |
|---|---|---|---|---|---|---|
| 4D1 | A | $\bar{B}$ | $\bar{A}$ | B | $\bar{A}B + A\bar{B}$ | $\bar{A}\bar{B} + AB$ |
| 4D2 | $C_1$ | $\bar{A}B + A\bar{B}$ | A | B | $C_2$ | $\bar{C}_2$ |
| 4D3 | $\bar{A}B + A\bar{B}$ | $\bar{C}_1$ | $\bar{A}\bar{B} + AB$ | $C_1$ | S | $\bar{S}$ |
| 7D | S | $\bar{C}_1$ | $\bar{S}$ | $C_1$ | $S\bar{C}_2 + \bar{S}C_2$ | $\bar{S}\bar{C}_2 + SC_2$ |
| 8D | A | $\bar{B}$ | $\bar{A}$ | B | $\bar{A}B + A\bar{B}$ | $\bar{A}\bar{B} + AB$ |

[1] This table is for bit =1.

As stated above in discussion of FIG. 2, the IF circuits 9D—9N, 12D—12N are preferably of the type shown in FIG. 4. The input and output designations used in FIG. 4 are the same as used in Table III. As evident from inspection, the circuit of FIG. 4 is similar to that of FIG. 3 except for omission of source 37 and diode 38. The description of FIG. 4 may therefore be accordingly shortened.

In FIG. 4, the $X_1$, $X_2$ inputs are applied to the base terminals of a pair of transistors 50, 51 having their emitters connected to the positive terminal of constant-current source 56, to which terminal is also connected the emitter of the grounded base transistor 54. The $Y_1$, $Y_2$ inputs are applied to the base terminals of a second pair of transistors 60, 61 having their emitters connected to the positive terminal of constant-current source 66, which terminal is also connected to the emitter of the grounded base transistor 64. The Zener diode 78 maintains a negative bias on the collector of transistors 54, 64.

For the input conditions set forth in lines 3 and 4 of Table III, one or the other of each pair of transistors 50, 51 and 60, 61 is conductive, and, consequently, both transistors 54 and 64 are effectively non-conductive. In such case, the collector current on line 57 is essentially 0 and 6 milliamperes flow through diode 78 to source 58. Of this, 4 milliamperes flow to the diode 78 from source 77, and the remaining 2 milliamperes flow from ground through resistor 79. Assuming a value of 300 ohms for resistor 79, the output terminal Z of the IF circuit is 0.6 volt negative with respect to ground. As used in the system of FIG. 2, such negative output is ineffective upon the AND-gate 10.

For the input conditions set forth in lines 1 and 2 of Table III, one or the other of the transistors 54, 64 is conductive, and, consequently, the current on line 57 is 4 milliamperes. In such case, 2 milliamperes flow through diode 78 to line 57. Since of the 4 milliamperes flowing from source 77 only 2 milliamperes flow through diode 78, the remaining 2 milliamperes flow to ground through output resistor 79, making the output terminal Z 0.6 volt positive with respect to ground. Such positive output signal of the IF circuit of FIG. 4 is indicative, as used in the system of FIG. 2, of proper functioning of the associated circuits of the stage.

No discussion of source 53, resistor 69 and the currents on line 52 appears necessary; the negative voltage drop appearing across resistor 69 is not used as an output.

As stated in discussion of FIG. 2, the carry-check circuits 11D—11N are preferably of the type shown in FIG. 5 now described. The input and output designations used in FIG. 5 are the same as used in FIG. 2 and Table IV. The $A_1$, $B_1$, $C_1$ inputs are respectively applied to the base terminals of transistors 80, 81, 82 whose collectors are connected by line 90 to the negative terminal of the constant-current source 83. The emitters of transistors 80, 81, 82 are respectively connected to the positive terminals of constant-current sources 84, 85, 86. The positive terminals of these sources are also respectively connected to the emitters of the grounded base transistors 87, 88, 89. The collectors of transistors 87—89 are connected by line 91 to the negative terminal of the constant-current supply source 92. The Zener diodes 93, 96 each provides a negative bias for the associated collectors.

The $Z_2$ output terminal of the carry-check circuit is connected to line 90 through diode 93, to ground through the output resistor 94, and to the positive terminal of constant-current source 95. The $Z_1$ output terminal of the carry-check circuit is connected to line 91 through diode 96, to ground through the output resistor 97, and to the positive terminal of the constant-current source 98.

When all of the input signals $A_1$, $B_1$, $C_1$ are negative (line 1 of Table IV), all of the transistors 80, 81, 82 are switched on and all of transistors 87, 88, 89 are switched off. In such case, the currents on lines 90, 91 are therefore respectively 7.5 milliamperes and 0 ampere. Since 12 milliamperes flow to source 92, the diode 96 must pass 12 milliamperes. Of this, the source 98 supplies only 8 milliamperes, and, consequently, the remaining 4 milliamperes flow from ground through resistor 97. Assuming the resistor 97 has a value of 400 ohms, the output terminal $Z_1$ is 1.6 volts negative with respect to ground. Of the 12 milliamperes flowing to source 83, the line 90 supplies 7.5 millamperes, as stated above, and the remaining 4.5 milliamperes flow through diode 93. Since of the 8 milliamperes flowing from source 95 only 4.5 milliamperes flow to diode 93, the remaining 3.5 milliamperes flow through output resistor 94 to ground. Since resistor 94 is also assumed to have a resistance of 400 ohms, the output terminal $Z_2$ is therefore 1.4 volts positive with respect to ground.

When any two of the inputs $A_1$, $B_1$, $C_1$ are negative and the third one is positive (lines 2, 3 and 8 of Table IV), two of the transistors 80—82 are switched on and one of the transistors 87—89 is switched off. In such case, the current on line 90 is 5 milliamperes and the current on line 91 is 2.5 milliamperes. Therefore, the diode 96 passes 9.5 milliamperes for addition to the 2.5 milliamperes on line 91 to make up the 12 milliamperes flowing to source 92. Since the source 98 supplies only 8 milliamperes to the diode, the remaining 1.5 milliamperes flow from ground through resistor 97, to the diode, making the $Z_1$ terminal at a potential which is 0.6 volt negative with respect to ground. With 5 milliamperes on line 90, the diode 93 passes 7 milliamperes to make up the 12 milliamperes flowing to source 83. Of the 8 milliamperes flowing from source 95, 7 milliamperes flow to diode 93, and the remaining 1 milliampere flows to ground through resistor 94. Thus, the potential of the $Z_2$ output terminal is 0.4 volt positive with respect to ground.

When any two of the inputs $A_1$, $B_1$, $C_1$ are positive, and the third is negative (lines 4, 5, 6 of Table IV), only one of the transistors 80—82 is switched on and two of the transistors 87—89 are switched off. In such case, the current on line 90 is 2.5 milliamperes and the current on line 91 is 5 milliamperes. This is the reverse of the conditions discussed in the preceding paragraph and, accordingly, the potentials of the $Z_1$, $Z_2$ output terminals, with respect to ground are respectively plus 0.4 volt and minus 0.6 volt.

When all three of the inputs $A_1$, $B_1$, $C_1$ are positive (line 7 of Table IV), all of the transistors 80—82 are switched off and all of the transistors 87—89 are switched on. In such case, the currents on lines 90 and 91 are respectively 0 milliampere and 7.5 milliamperes. This is the reverse of the input conditions first assumed in discussion of FIG. 5, and, accordingly, the potentials of the $Z_1$, $Z_2$ terminals with respect to ground are respectively plus 1.4 volts and minus 1.6 volts.

The manner in which the circuit of FIG. 5 is used to check the carry produced in a computer has been described in connection with FIG. 2.

For brevity in the appended claims, it shall be understood that the term "algebraic addition" is generic to arithmetic addition and subtraction. While there have been shown and described and pointed out the fundamental novel features of the invention as applied to a preferred embodiment, it will be understood that various omissions and substitutions and changes in the form and details of the device illustrated and in its operation may be made by those skilled in the art without departing from tne spirit of the invention. It is the intention, therefore, to be limited only as indicated by the scope of the following claims.

What is claimed is:

1. An arrangement suited for algebraically adding two multi-order binary values comprising a plurality of cascaded stages each comprising two register means for producing outputs respectively representative of the values of the binary digits of the corresponding order, a first combining means responsive to said outputs and to an in-carry signal for producing a third output normally representative of the algebraic sum of said digital values and for producing an out-carry signal, a first circuit having said third output and said in-carry signal as inputs, a second circuit having the outputs of said two register means as inputs, and a third circuit to which the outputs of said first and second circuits are applied for producing a check signal indicating that said third output is correct.

2. An arrangement as in claim 1 which additionally includes an AND-gate to which the output signals of said third circuits of all stages are applied as inputs, said AND-gate producing an output signal only if all of said third circuits have each produced a check signal.

3. An arrangement as in claim 1 in which each stage additionally includes a second combining means responsive to the outputs of said two register means and to the in-carry signal of the stage for producing an output signal representing the proper value of said out-carry signal of the stage, and a fourth circuit to which said in-carry signal and the output signal of said second combining means are applied as inputs for producing a check signal indicating that the out-carry signal produced by said first combining means is correct.

4. An arrangement as in claim 3 which additionally includes an AND-gate to which the output signals of said third and fourth circuits of each of all of the stages are applied as inputs, said AND-gate producing an output signal only when said third and fourth circuits of all stages produce a check signal.

5. An arrangement suited for algebraically adding two multi-order binary values comprising a plurality of cascaded stages each comprising two register means for producing outputs respectively representative of the values of the binary digits of the corresponding order, a first combining means responsive to said outputs and to an in-carry signal for producing a third output normally representative of the algebraic sum of said digital values and for producing an out-carry signal, a third register means for storing said third output produced by said first combining means, a second combining means to which the outputs of said first-named two register means and said in-carry signal are applied as inputs for producing an output signal representing the proper value of said out-carry signal, and a circuit to which said out-carry signal and the output signal of said second combining means are applied as inputs for producing a check signal indicating that the out-carry signal produced by said first combining means is correct.

6. An arrangement as in claim 5 which additionally includes an AND-gate to which the output signals of said circuits of all stages are applied as inputs, said AND-gate producing an output signal only if all of said circuits have each produced a check signal indicating that the out-carry signal of the corresponding stage is correct.

7. An arrangement suited for addition or subtraction of binary numbers comprising a plurality of cascaded stages each comprising two register means for producing outputs respectively representative of the values of the binary digits of the corresponding order, a first combining means responsive to said outputs and to an in-carry signal for producing a resultant output and an out-carry signal, a pair of EXCLUSIVE-OR circuits one of which has said resultant output and said in-carry signal as inputs and the other of which has the outputs of said two register means as inputs, an IF circuit to which the outputs of said EXCLUSIVE-OR circuits are supplied to produce a check signal normally corresponding with said resultant output of said combining means, and switching means selectively operable to effect addition, subtraction by 2's complements or subtraction by 1's complements; said switching means for addition supplying to the first stage of said arrangement an in-carry signal representing 0; for subtraction by 2's complements supplying to the first stage an in-carry signal representing 1, and for subtraction by 1's complements supplying to the first stage as its in-carry signal the out-carry signal of the highest order stage.

8. An arrangement as in claim 7 in which each stage additionally includes a second combining means responsive to the outputs of its said two register means and to the in-carry signal of the stage for producing an output signal representing the proper value of the out-carry of the stage, and an IF circuit to which the output signal of said second combining means and the in-carry signal are applied for producing a check signal indicating that the out-carry signal produced by said first combining means is correct for the type operation selected by said switching means.

9. An arrangement as in claim 8 additionally including an AND-gate to which are applied the output signals of the two IF circuits of each of all of the stages for producing an overall check signal when the operation selected by said switching means has been completed and the total resultant is correct.

10. An arrangement suited for addition or subtraction of binary numbers comprising a plurality of stages each comprising two register means for respectively producing outputs representative of the digits of the corresponding order, a combining network comprising three EXCLUSIVE-OR circuits, a first of which exclusively-OR's the outputs of said two register means, a second of which exclusively-OR's the outputs of said two register means, the output of said first EXCLUSIVE-OR circuit and an in-carry signal to produce an out-carry signal, and a third of which exclusively-OR's the output of said first EXCLUSIVE-OR circuit and the in-carry signal to produce a resultant output, and switching means selectively operable to apply to said third and second EXCLUSIVE-OR circuits of the first stage an in-carry signal representing 0 for effecting addition, an in-carry signal representing 1 for effecting subtraction by 2's complements, or an in-carry signal from said second EXCLUSIVE-OR circuit of the highest order stage for effecting subtraction by 1's complements.

11. An arrangement as in claim 10 additionally including a network comprising a pair of EXCLUSIVE-OR circuits, one of which exclusively-OR's the output of said third EXCLUSIVE-OR circuit and the in-carry signal and the other of which exclusively-OR's the output of said two register means, and an IF circuit responsive to the outputs of said pair of EXCLUSIVE-OR circuits for producing an output signal checking the correctness of said resultant output of said third EXCLUSIVE-OR circuit.

12. An arrangement as in claim 10 additionally including a Carry-check circuit responsive to the outputs of said two register means and to said in-carry signal, and an IF circuit responsive to the output of said Carry-check circuit and to said out-carry signal for producing an output signal checking the correctness of the binary value represented by said out-carry signal.

References Cited in the file of this patent

UNITED STATES PATENTS 2,861,744 Schmitt et al. ---------- Nov. 25, 1958